United States Patent
Rahim et al.

(10) Patent No.: US 8,737,403 B2
(45) Date of Patent: *May 27, 2014

(54) CONTEXT-SWITCHED MULTI-STREAM PIPELINED REORDER ENGINE

(75) Inventors: Rami Rahim, Sunnyvale, CA (US); Venkateswarlu Talapaneni, Cupertino, CA (US); Philippe G. Lacroute, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/329,616

(22) Filed: Dec. 19, 2011

(65) Prior Publication Data

US 2012/0087374 A1    Apr. 12, 2012

Related U.S. Application Data

(63) Continuation of application No. 12/499,543, filed on Jul. 8, 2009, now Pat. No. 8,102,858, which is a continuation of application No. 11/424,145, filed on Jun. 14, 2006, now Pat. No. 7,577,149, which is a continuation of application No. 09/955,122, filed on Sep. 19, 2001, now Pat. No. 7,085,274.

(51) Int. Cl.
 *H04L 12/28* (2006.01)
(52) U.S. Cl.
 USPC .......................... 370/394; 370/412
(58) Field of Classification Search
 None
 See application file for complete search history.

(56) References Cited

U.S. PATENT DOCUMENTS

| | | | |
|---|---|---|---|
| 4,907,147 A | 3/1990 | Saito et al. | |
| 5,829,034 A * | 10/1998 | Hagersten et al. | 711/141 |
| 6,226,687 B1 | 5/2001 | Harriman et al. | |
| 6,757,284 B1 | 6/2004 | Galles | |
| 6,831,923 B1 * | 12/2004 | Laor et al. | 370/412 |
| 6,993,028 B2 * | 1/2006 | Ornes et al. | 370/394 |
| 7,043,022 B1 * | 5/2006 | Blanchard et al. | 380/252 |
| 7,085,274 B1 * | 8/2006 | Rahim et al. | 370/394 |
| 7,209,482 B1 | 4/2007 | Rahim | |
| 7,243,184 B1 | 7/2007 | Ferguson et al. | |
| 7,543,195 B2 | 6/2009 | Nguyen et al. | |
| 7,577,149 B1 * | 8/2009 | Rahim et al. | 370/394 |
| 7,613,192 B1 | 11/2009 | Rahim | |
| 7,764,606 B1 | 7/2010 | Ferguson et al. | |
| 7,765,328 B2 * | 7/2010 | Bryers et al. | 709/249 |
| 8,102,858 B1 * | 1/2012 | Rahim et al. | 370/394 |
| 2002/0031125 A1 * | 3/2002 | Sato | 370/394 |
| 2002/0085578 A1 | 7/2002 | Dell et al. | |
| 2002/0146010 A1 | 10/2002 | Shenoi et al. | |
| 2002/0163935 A1 | 11/2002 | Paatela et al. | |

(Continued)

OTHER PUBLICATIONS

Co-pending U.S. Appl. No. 12/499,543, filed Jul. 8, 2009 entitled "Context-Switched Multi-Stream Pipelined Recorded Engine" by Rami Rahim et al., 35 pages.

*Primary Examiner* — Robert Wilson
(74) *Attorney, Agent, or Firm* — Harrity & Harrity, LLP

(57) ABSTRACT

A pipelined reorder engine reorders data items received over a network on a per-source basis. Context memories correspond to each of the possible sources. The pipeline includes a plurality of pipeline stages that together simultaneously operate on the data items. The context memories are operatively coupled to the pipeline stages and store information relating to a state of reordering for each of the sources. The pipeline stages read from and update the context memories based on the source of the data item being processed.

20 Claims, 9 Drawing Sheets

(56) References Cited

U.S. PATENT DOCUMENTS

| | | |
|---|---|---|
| 2003/0005164 A1 | 1/2003 | Trainin |
| 2003/0012199 A1 | 1/2003 | Ornes et al. |
| 2003/0191844 A1 | 10/2003 | Meyer et al. |
| 2003/0196040 A1 | 10/2003 | Hosogi et al. |
| 2012/0087374 A1* | 4/2012 | Rahim et al. ............ 370/394 |

* cited by examiner

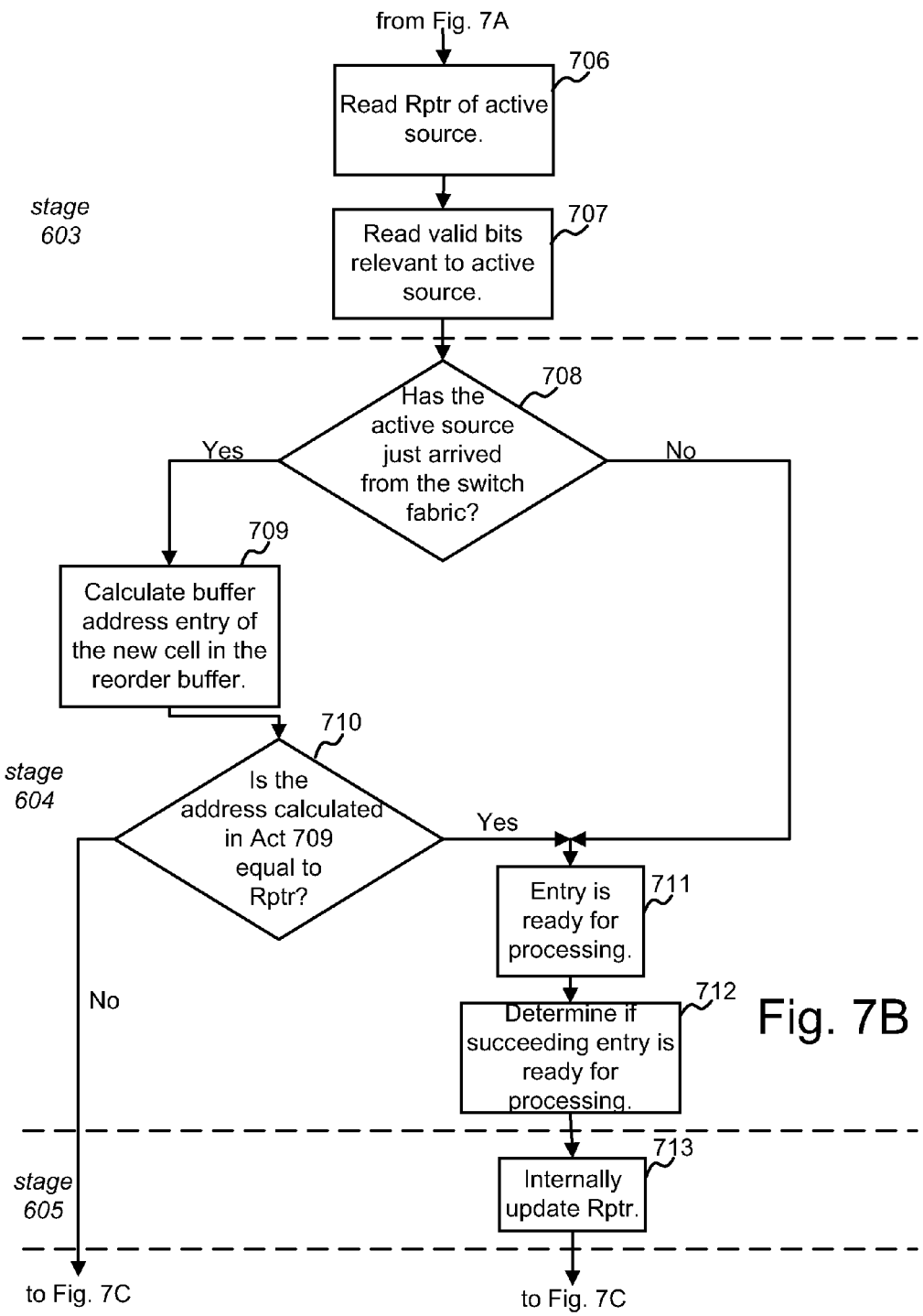

CONTEXT-SWITCHED MULTI-STREAM PIPELINED REORDER ENGINE

RELATED APPLICATIONS

This application is a continuation of U.S. patent application Ser. No. 12/499,543, filed Jul. 8, 2009 (now U.S. Pat. No. 8,102,858), which is a continuation of U.S. patent application Ser. No. 11/424,145, filed Jun. 14, 2006 (now U.S. Pat. No. 7,577,149), which is a continuation of U.S. patent application Ser. No. 09/955,122, filed Sep. 19, 2001 (now U.S. Pat. No. 7,085,274), which are incorporated herein by reference.

BACKGROUND OF THE INVENTION

A. Field of the Invention

The present invention relates generally to data processing and, more particularly, to reordering of information that arrives in an out-of-order sequence after transmission.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were architected. Purpose-built routers are designed and built with components optimized for routing. They not only handled higher line rates and higher network traffic volume, they also added functionality without compromising line rate performance.

A purpose-built router may include a number of input and output ports from which it transmits and receives information packets. A switching fabric or other transmission medium may be implemented in the router to carry the packets between the ports. In a high-performance purpose-built router, the switching fabric may transmit a large amount of information between a number of internal components. Typically, the information is transmitted in discrete quantities called packets, or broken down even further into a series of cells.

One property of the switching fabric is that, even though it may have enough bandwidth to handle its cell traffic, cells transmitted to a particular destination may arrive at that destination in an out-of-order sequence. Thus, although a first cell may be transmitted before a second cell, the second cell may be received before the first cell. Generally, the order of the received cells is important and should be preserved.

Reorder circuits may be used to reorder cells received from a particular source into their correct transmission order. Essentially, each cell, as it is transmitted from a source, is appended with a sequence number. The reorder circuits examine the received sequence numbers to determine the correct cell order. In the situation in which there are multiple possible sources, such as, for example, in a switching fabric that cross-connects a large number of sources, a corresponding large number of reorder circuits are required. This can be inefficient, both because of the large hardware requirements of all the reorder circuits and because while the reorder circuits dedicated to certain sources may be running at maximum capacity, the reorder circuits dedicated to other sources may be sitting idle.

Thus, there is a need in the art to more efficiently implement the functionality performed by multiple reorder circuits that reorder information received from multiple sources.

SUMMARY OF THE INVENTION

Structure and processes consistent with the principles of the invention, among other things, efficiently reorder information streams received from multiple sources.

One aspect of the present invention is directed to a reorder engine for reordering, on a per-entity basis, out-of-order data items received from sources. The reorder engine comprises a plurality of pipeline stages that together simultaneously operate on the data items. Additionally, per-entity context memories are operatively coupled to the pipeline stages. The per-entity context memories store information relating to a state of reordering for each of the entities. The pipeline stages read from and update the context memories based on the entity corresponding to the data item being processed.

A second aspect of the present invention is directed to a method of reordering data items. The method includes receiving the data items from a plurality of entities, inputting the received data items into a pipelined reorder engine, and forwarding each of the input data items through stages of the pipelined reorder engine. The pipelined reorder engine reorders the received data items on a per-entity basis to correspond to a transmitting order of the data items.

Yet another aspect consistent with the principles of the present invention is directed to a network device that comprises a data transmission component and processing elements connected by the data transmission component. The processing elements communicate with one another by transmitting data items over the data transmission component. Each of the processing elements includes a reorder engine configured to arrange received data items into an order corresponding to an order in which the data items were transmitted. Each of the reorder engines includes a pipeline having a number of pipeline stages that together simultaneously operate on the received data items to arrange the data items into the order corresponding to the order in which the data items were transmitted.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 7A, 7B, and 7C are flowcharts illustrating operation of the pipeline shown in FIG. 6.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation, a pipelined reorder engine processes incoming streams of data items from a plurality of sources. Each data item is processed in several pipeline stages. Together, the pipeline stages implement a high-performance reorder engine capable of reordering the data items on a per-source basis.

System Description

Figure 1:
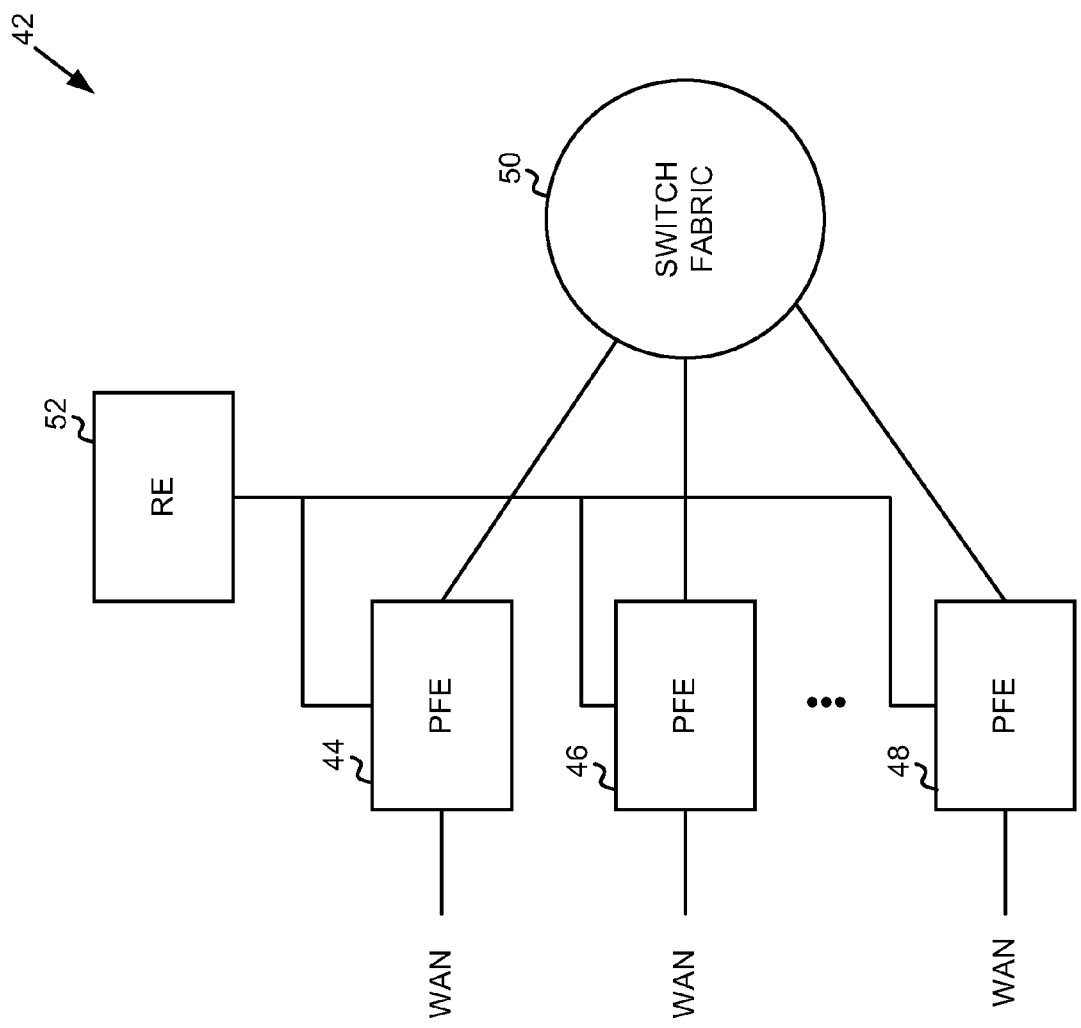
FIG. 1 is a block diagram illustrating an exemplary routing system in which systems and methods consistent with the principles of the invention may be implemented.

FIG. 1 is a block diagram illustrating an exemplary routing system 42 in which the present invention may be implemented. System 42 comprises packet forwarding engines (PFEs) 44, 46 . . . 48, a switch fabric 50, and a routing engine (RE) 52. System 42 receives a data stream from a physical link, processes the data stream to determine destination information, and transmits the data stream out on a link in accordance with the destination information.

RE 52 performs high level management functions for system 42. For example, RE 52 communicates with other networks and systems connected to system 42 to exchange information regarding network topology. RE 52 creates routing tables based on network topology information and forwards the routing tables to PFEs 44, 46, and 48. The PFEs use the routing tables to perform route lookup for incoming packets. RE 52 also performs other general control and monitoring functions for system 42.

PFEs 44, 46, and 48 are each connected to RE 52 and switch fabric 50. PFEs 44, 46, and 48 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 44 will be used, by way of example, to discuss the operations performed by PFEs 44, 46, and 48 consistent with the principles of the invention. PFE 44 processes incoming data by stripping off the data link layer. PFE 44 converts header information from the remaining data into a data structure referred to as a notification.

For example, in one embodiment, the data remaining after the data link layer is stripped off is packet data. PFE 44 converts the layer 2 (L2) and layer 3 (L3) packet header information included with the packet data into a notification. PFE 44 stores the notification, some control information regarding the packet, and the packet data in a series of cells. In one embodiment, the notification and the control information are stored in the first two cells of the series of cells.

PFE 44 performs a route lookup using the notification and the routing table from RE 52 to determine destination information. PFE 44 may also further process the notification to perform protocol-specific functions, policing, and accounting, and might even modify the notification to form a new notification.

If the destination indicates that the packet should be sent out on a physical link connected to PFE 44, then PFE 44 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 50, then PFE 44 retrieves the cells for the packet, modifies the first two cells with the new notification and new control information, if necessary, and sends the cells to the other PFE via switch fabric 50. Before transmitting the cells over switch fabric 50, PFE 44 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 52, PFEs 44, 46, and 48, and switch fabric 50 perform routing based on packet-level processing. The PFEs store each packet using cells while performing a route lookup using a notification, which is based on packet header information. A packet might be received on one PFE and go back out to the network on the same PFE, or be sent through switch fabric 50 to be sent out to the network on a different PFE.

Figure 2:
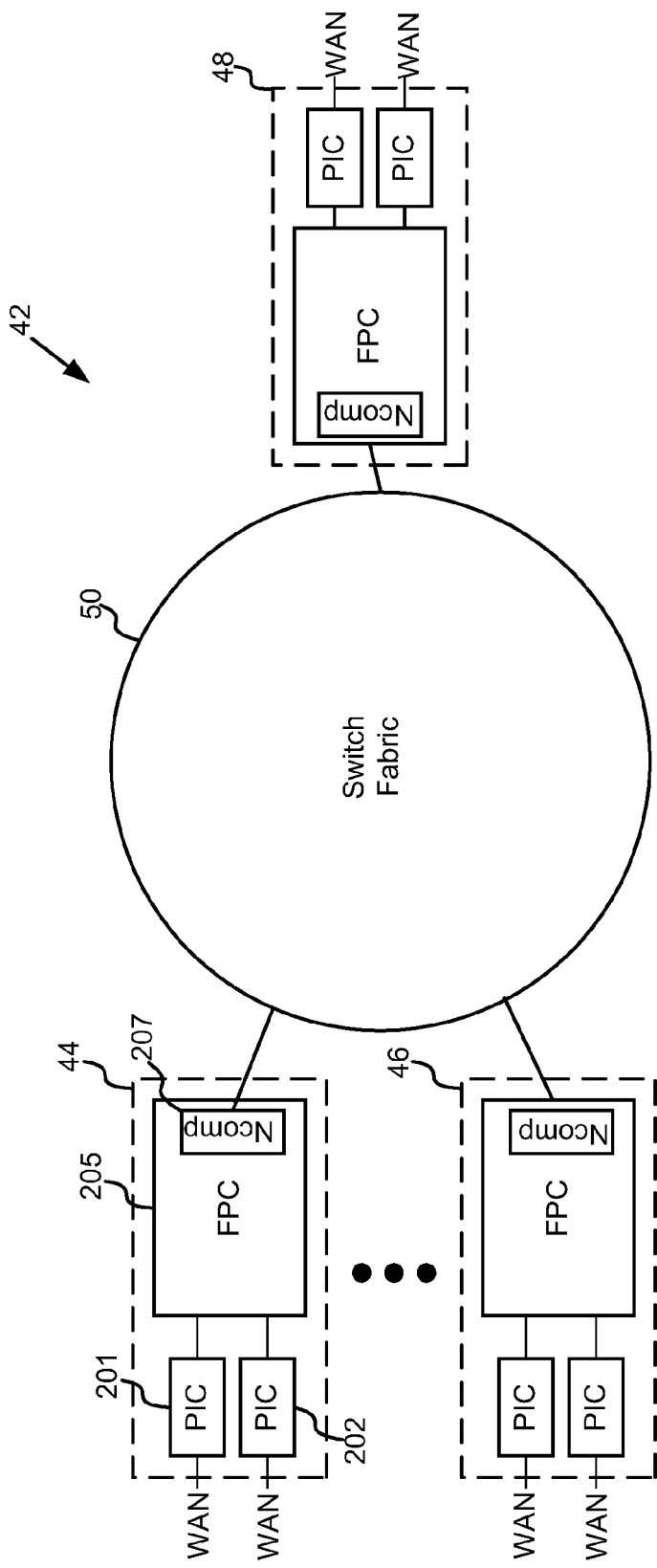
FIG. 2 is a detailed block diagram illustrating portions of the routing system shown in FIG. 1.

FIG. 2 is detailed a block diagram illustrating portions of routing system 42. PFEs 44, 46, and 48 connect to one another through switch fabric 50. Each of the PFEs may include one or more physical interface cards (PICs) 201-202 and flexible port concentrators (FPCs) 205.

PIC 201 may transmit data between a WAN physical link and FPC 205. Different PICs are designed to handle different types of WAN physical links. For example, PIC 201 may be an interface for an optical link while PIC 202 may be an interface for an Ethernet link. Although FIG. 2 shows two PICs connected to the FPCs, in other embodiments consistent with principles of the invention there can be more or fewer PICs connected to an FPC.

FPCs, such as FPC 205, handle packet transfers to and from PICs 201 and 202, and switch fabric 50. For each packet it handles, FPC 205 performs the previously-discussed route lookup function. FPCs 205 communicate with switch fabric 50 through a fabric communication component 207 (labeled as Ncomp). Communication component 207 handles the protocols associated with transmitting cells to and receiving cells from switch fabric 50. In one embodiment, switch fabric 50 supports 144 communication components, implemented in 144 FPCs 205.

As previously mentioned, cells transmitted by a source communication component 207 over switch fabric 50 may be received in an out-of-order sequence at the destination communication component. The destination communication component reorders the received cells into their appropriate order.

Figure 3:
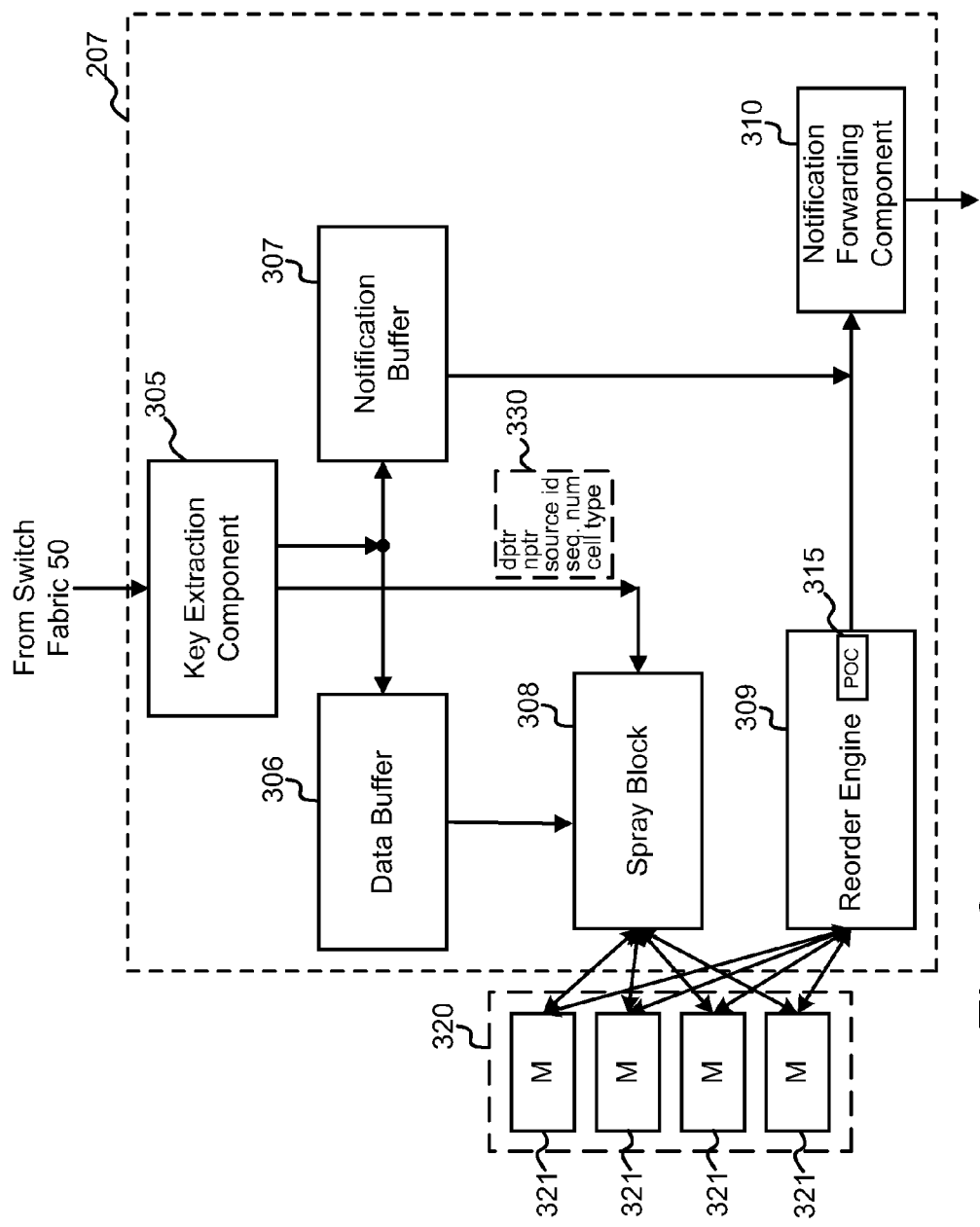
FIG. 3 is a diagram illustrating portions of a communication component shown in FIG. 2.

FIG. 3 is a diagram illustrating portions of communication component 207 relating to the reception and reordering of data cells from switch fabric 50. Communication component 207 includes a key extraction component 305, a data buffer 306, a notification buffer 307, a spray block 308, a reorder engine 309, and a notification forwarding component 310. Communication component 207 stores received cells in memory 320. In one embodiment, memory 320 is a distributed memory made of separate memory elements 321.

Cells from switch fabric 50 are received at key extraction component 305, which extracts the notifications from the received cells. In one embodiment, each cell is labeled with a cell type identifier, such as "FC" (first cell of packet), "SC" (second cell of packet), "MC" (a middle cell of a packet), and "LC" (last cell of a packet). The first two cells of a packet store notification information for the series of cells carrying a packet. Key extraction component 305 identifies the first two cells based on the cell type identifier, inserts the notification from the cells, and stores the notification in buffer 307. The cells carrying each packet are then stored by key extraction component 305 into data buffer 306.

Key extraction component 305, in addition to storing the received cells into data buffer 306 and the notification in notification buffer 307, forwards cell identification information 330 to spray block 308. As shown in FIG. 3, identification information 330 may include either a pointer to the location of the data cell in data buffer 306 (dptr) or both a pointer to a notification cell in notification buffer 307 (nptr) and a pointer to a data cell in the data buffer; source identification information (source ID) that identifies the source which transmitted the cell; the cell's sequence number (seq. num), and the cell's type. Spray block 308 stores identification information 330, along with the corresponding data cell from data buffer 306, in distributed memory 320. The cell identification information 330 is also forwarded to reorder engine 309, which generates, for each packet, a packet order table ("POC") 315 that references, in the correct cell order, the cells in memory 320 that comprise the packet.

Reorder engine 309 forwards the completed packet order tables 315 to notification forwarding component 310, which reunites the packet order tables 315 with the notification information for the packet stored in notification buffer 307, thus generating the final notification. As previously described, the notifications are used by the PFEs to, for example, perform protocol-specific functions, policing, and accounting. The notification also references the corresponding packet's correctly ordered data cell in memory 320.

Figure 4:
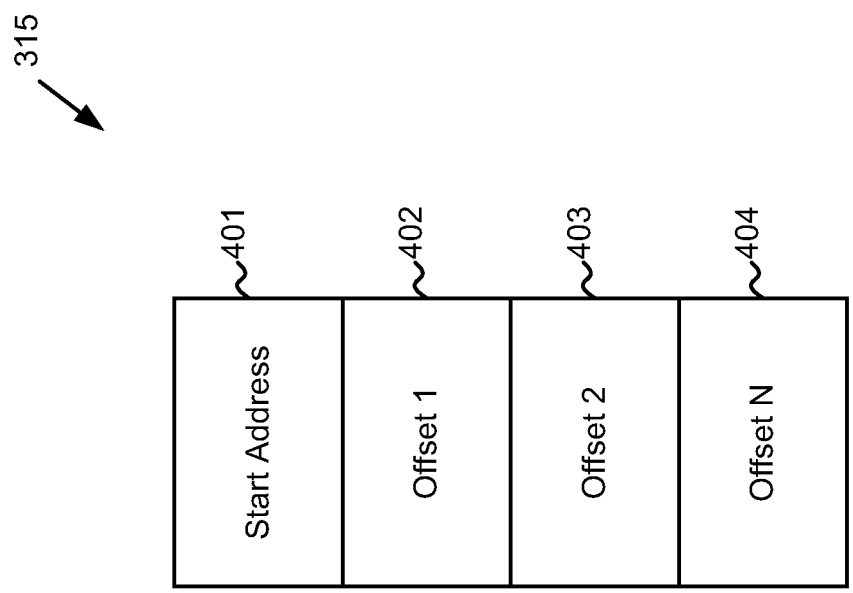
FIG. 4 is a diagram illustrating an exemplary packet order table.

FIG. 4 is a diagram illustrating an exemplary packet order table 315 in more detail. The table begins with a start address 401 that indicates the location in memory 320 of the first cell in the packet. To conserve space, succeeding cells in the packet may be referenced as offset values from a previous cell. As shown in FIG. 4, for example, offset entry 402 may refer to a difference between the address of the second cell of the packet in memory 320 and the start address, while offset entry 403 may refer to a difference between the address of the third cell of the packet in memory 320 and the address of the second cell of the packet in memory 320. This sequence continues through the last cell ("N"), offset 404, of the packet. The offset entries in packet order table 315 are generated by reorder engine 309 and are listed in table 315 in the correct order of the cells in the packet.

Consistent with the principles of the invention, reorder engine 309 is a context-switched pipeline engine that manages cell reordering for the cell sources connected to communication component 207. Reorder engine 309 switches between various context memories based on the source being processed at the particular stage of the pipeline. One such memory, a reorder buffer, is implemented for each possible source. The reorder engine 309 will be described in more detail below.

Figure 5:
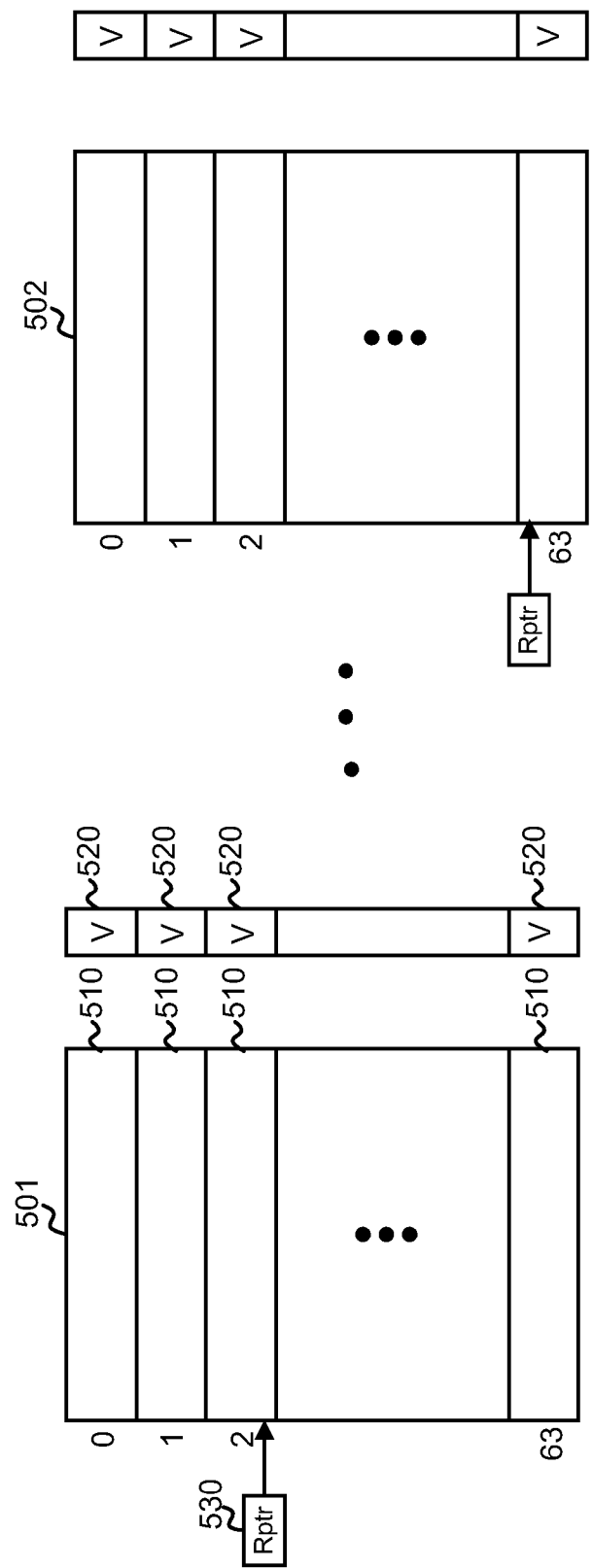
FIG. 5 is diagram illustrating reorder buffers and associated validity memories in a reorder engine consistent with an aspect of the present invention.

FIG. 5 is diagram illustrating reorder buffers 501-502 and associated validity memories in reorder engine 309. One reorder buffer is implemented for each source on switch fabric 50. In one embodiment, in which there are 144 possible sources connected to switch fabric 50, reorder engine includes 144 reorder buffers. Each of the reorder buffers, such as reorder buffer 501, includes a plurality of buffer entries 510. In the embodiment shown in FIG. 5, each reorder buffer includes 64 entries, labeled as entries zero through 63. Each entry 510 stores information corresponding to a cell (or, more generally, any data unit) stored in memory 320. More particularly, an entry 510 may store the nptr, the cell address in memory 320, and the cell type for the cell. Entries 510 are each additionally associated with a valid ("V") bit 520 used to indicate whether there is valid information in the corresponding entry 510. A "1," for example, may indicate that the entry contains valid cell information while a "0" may indicate that the entry is empty.

Reorder buffer 501 is implemented as a circular buffer. Rptr 530 stores a value that points to the rear most active entry in reorder buffer 501. New cells are written to the reorder buffer 501 within an active window of entries that extends from the entry referenced by Rptr 530 up through a predetermined number of entries (e.g., 20 entries) based on the cell's sequence number. When a cell is received which has a sequence number that corresponds to the entry pointed to by Rptr, the reorder engine 309 processes the corresponding cell as the next cell in the correct order of received cells. Reorder engine 309 may then increment Rptr, effectively sliding the window one entry forward in the reorder buffer. Because reorder buffer 501 is a circular buffer, Rptr 530 wraps around to the first entry in the reorder buffer 501 after reaching the last entry in the reorder buffer 501.

Figure 6:
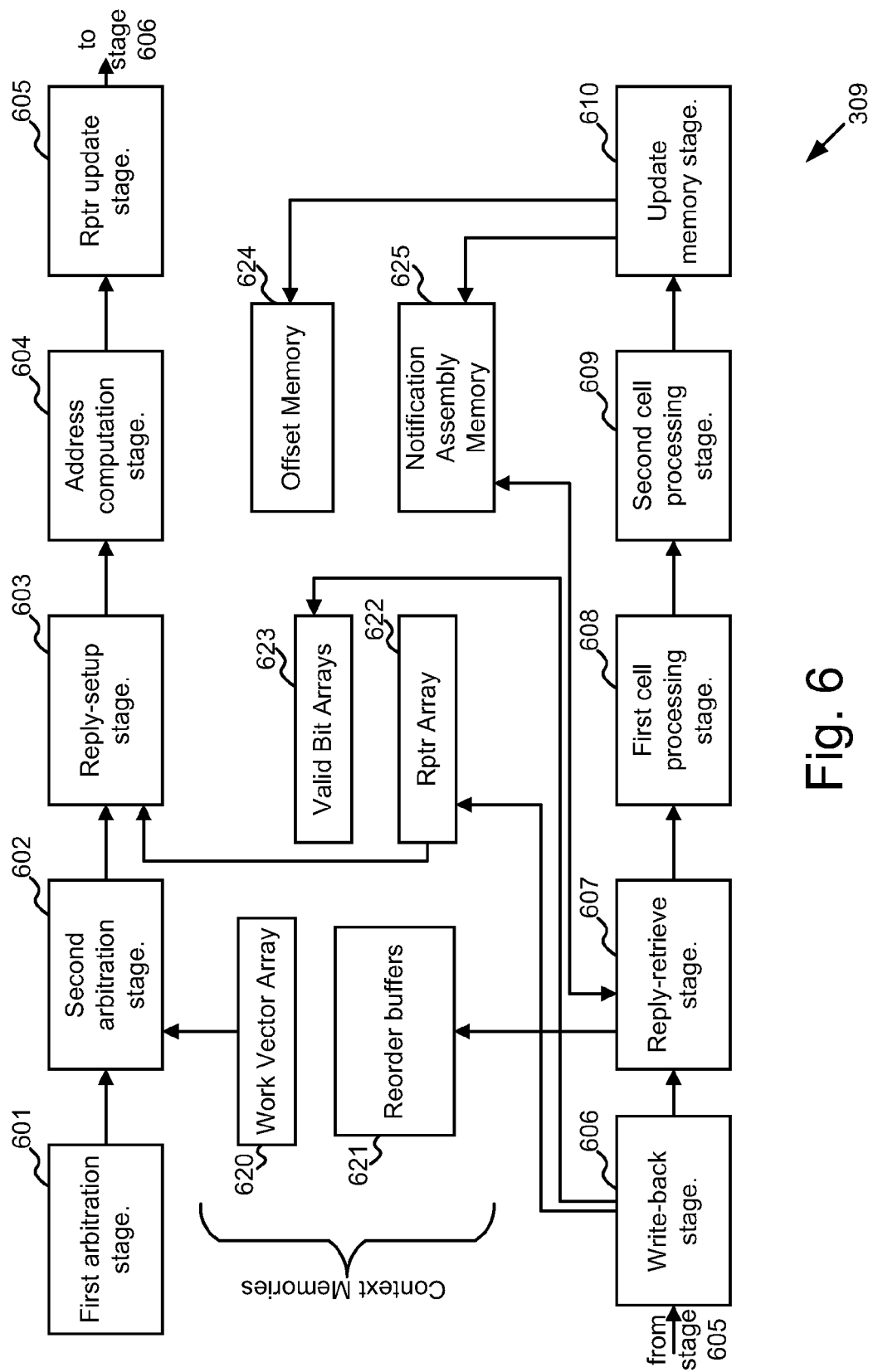
FIG. 6 is a diagram illustrating the architecture of the pipeline structure of the reorder engine.

FIG. 6 is a diagram illustrating reorder engine 309. Reorder engine 309 comprises pipeline stages 601-610. The pipeline stages sequentially include: first arbitration stage 601, second arbitration stage 602, reply-setup stage 603, address computation stage 604, Rptr update stage 605, write-back stage 606, reply-retrieve stage 607, first cell processing stage 608, second cell processing stage 609, and update memory stage 610.

Reorder engine 309 additionally includes a number of per-source context memories that are accessed by pipeline stages 601-610. These context memories are illustrated as context memories 620-625. Reorder buffers 621 include per-source reorder buffers, such as reorder buffers 501-502. Each reorder buffer is also associated with an Rptr, stored in Rptr array 622. Accordingly, if there are 144 sources (and 144 reorder buffers), Rptr array 622 stores 144 Rptrs. Similarly, valid bit arrays 623 are implemented as a number of arrays equal to the number of reorder buffers. Each of the valid bit arrays includes a valid bit 520 for each entry in its corresponding reorder buffer.

Work vector array 620 is a register including a bit for each source (e.g., a 144 bit register if there are 144 sources). Reorder engine 309 uses work vector array 620 to indicate when there is work to be done for a particular source. More particularly, when the Rptr value for a particular source is associated with an entry having a valid bit, reorder engine 309 can process this entry. Accordingly, reorder engine 309 may set the corresponding bit in work vector array 620 to indicate that work can be performed for this source.

Last address memory 624 is an array of per-source memories that store temporary information used to create packet order tables 315. More specifically, for each source, offset memory 624 includes storage for reorder engine 309 to store the last address in memory 320 from the source. Notification assembly memory 625 is an array of per-source memories used to store the information in packet order table 315 as the table is being created.

System Operation

Figure 7A:
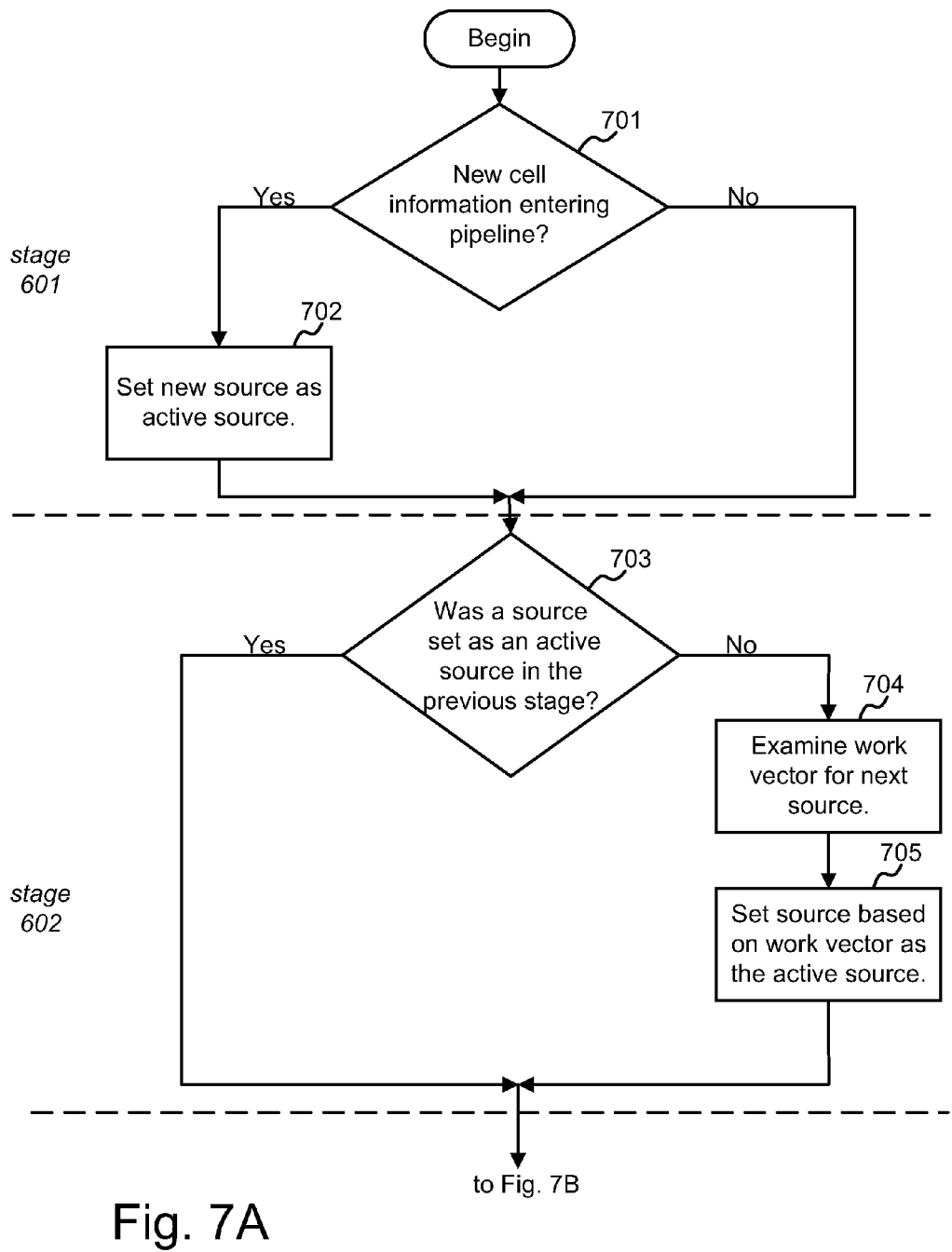
Figure 7C:
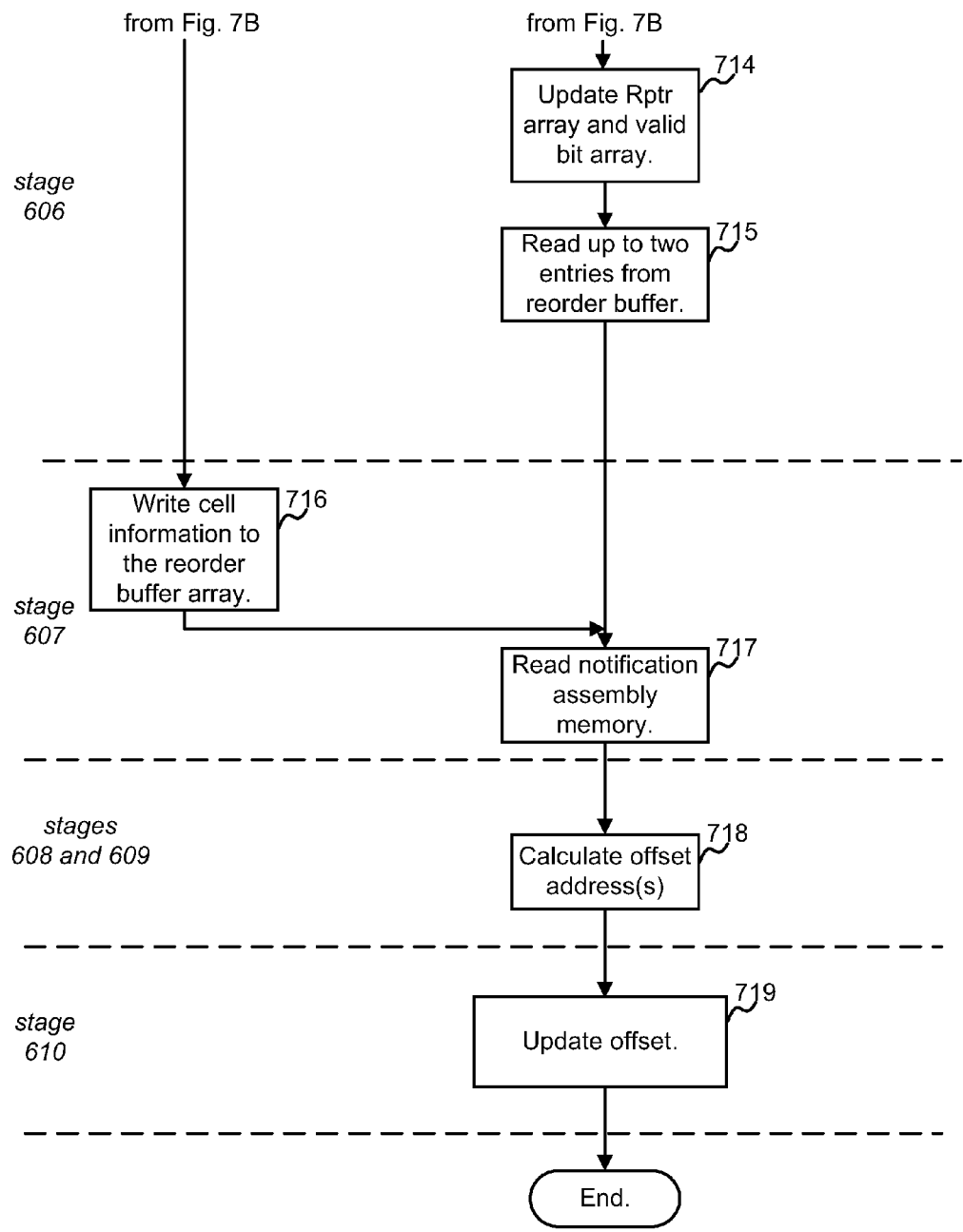

The interaction of reorder engine 309 with its context memories will next be described with reference to FIGS. 7A-7C.

To begin, cell identification information 330 for a particular cell is received at first arbitration stage 601 of reorder engine 309 from memory 320. First arbitration stage 601 and second arbitration stage 602 together determine which of the 144 possible sources is to be an active source in the pipeline. Sources having new cells entering the pipeline at first arbitration stage 601 are given priority. Thus, when a new cell enters the pipeline at first arbitration stage 601, the first arbitration stage selects the source associated with that cell as the active source. (Acts 701, 702). In this situation, the second arbitration stage 602, in the next pipeline cycle, passes the active source to the third pipeline stage (Act 703). Otherwise, when there are no new cells from the switch fabric, both first and second arbitration stages 601 and 602 consult work vector array 620 and select the active source based on the indications in the work vector array of the sources that are waiting to be serviced (Acts 704 and 705).

The reply-setup stage 603 next reads the Rptr associated with the active source from Rptr array 622 (Act 706). Additionally, the reply-setup stage 603 may read the valid bits from the valid bit array associated with the active source (Act 707).

With the information received from reply-setup stage 603, address computation stage 604, if necessary, computes the address in the reorder buffer 501 of the active source at which the entry is to be stored (Acts 708, 709). For sources selected by the second arbitration stage 602 based on work vector array 620, no action is performed in this stage, as the reorder buffer has already been written during a prior cycle of the pipeline. Otherwise, the address computation stage 604 determines the entry address of the reorder buffer 501 based on the sequence number of the active cell (Act 709). Because the number of available sequence numbers can be much greater than the number of entries 510 in reorder buffer 501, the appropriate address in the reorder buffer 501 is based on a modulo operation. Specifically, address computation stage 604 calculates the address as the sequence number modulo the number of entries in the buffer memory. If the Rptr received from stage 603 and the new buffer address calculated in Act 709 are the same, the address computation stage 604 indicates that this entry in the reorder buffer is ready for processing (Acts 710 and 711). If the valid bit of the next entry in the reorder buffer is set, address computation stage 604 indicates that this next entry is also ready for processing (Act 712). Based on the results in Acts 710 and 711, Rptr update stage 605 internally updates Rptr to point to the next entry in the reorder buffer (i.e., it increments the Rptr one or two places) and internally updates the valid bits 623 (Act 713).

Based on the calculated result of Rptr and the valid bits determined by the address computation stage 604 and the Rptr update stage 605, write-back stage 606 correspondingly updates the Rptr array 622, the valid bit array 623, and the work vector array 620 (Act 714). Further, if appropriate, write-back stage 606 reads the entries indicated in Acts 711 and 712 (up to two) from the reorder buffer (Act 715). As previously mentioned, the reorder buffer may store information, such as a cell's nptr, it's address in memory 320, and the cell's type.

For received cells that have an address in the reorder buffer that is not equal to Rptr, reply-retrieve stage 607 writes the cell information to the reorder buffer at the calculated buffer address (Act 716). Reply-retrieve stage 607 also reads last address memory 624 to retrieve the address of the previously processed cell (Act 717). This address is used by first cell processing stage 608 and second cell processing stage 609, along with the cell address in memory 320, to calculate next offset address for up to the two entries determined in Acts 711 and 712, (Act 718), and to update notification assembly memory 625 with these offset addresses.

Finally, update memory stage 610 updates last address memory 624 with the calculated offset. (Act 719).

As described above, reorder engine 309 can reorder received data units from a plurality of sources. A portion of the reorder process is performed by each of a plurality of pipeline stages that access a number of per-source context memories. In this manner, the reorder engine 309 achieves a high throughput without wasting design space on circuit areas that have a tendency to stand idle.

Although described in the context of a purpose-built router, concepts consistent with the principles of the invention can be implemented in any system that requires high performance data item processing. Apparatus, systems, and methods based on the principles of the pipeline engine described herein may be used in any environment for processing data items associated with an entity. The data items are processed using context switching for the entities. Entities may include sources of data items, as described herein, or other entities, such as destinations, processing threads, or any other entity having individual data items that must be processed.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   receiving, at a network device, data items associated with a plurality of sources;
   sequentially forwarding, at the network device, the received data items through a plurality of sequential processes to reorder the received data items, on a per-source basis, to correspond to an order in which the received data items were transmitted by the plurality of sources; and
   storing, by the network device, information, used by one or more of the plurality of sequential processes to reorder particular data items of the received data items, transmitted by a corresponding source, of the plurality of sources, in a corresponding set of context memories, of a plurality of sets of context memories, to reorder the particular data items,
   the corresponding set of context memories being associated with the corresponding source, and
   other sets of context memories, of the plurality of sets of context memories, being associated with other sources of the plurality of sources.

2. The method of claim 1, where sequentially forwarding the received data items includes:
   calculating a position of a particular data item, of the particular data items, relative to other data items, of the particular data items, based on a sequence number of the particular data item, and
   forwarding the particular data item based on the calculated position of the particular data item.

3. The method of claim 2, where calculating the position of the particular data item includes:

calculating the position of the particular data item based on the sequence number modulo a size of a reorder buffer within the corresponding set of context memories.

4. The method of claim 3, where the corresponding set of context memories includes a valid bit array, associated with the reorder buffer, that indicates whether entries in the reorder buffer are valid.

5. The method of claim 1, where sequentially forwarding the received data items includes:
updating a memory, within one or more sets of context memories of the plurality of sets of context memories, with addresses of the received data items in the order the received data items were transmitted.

6. The method of claim 5, where the memory, within the one or more sets of context memories, is updated on a per-source basis.

7. A non-transitory memory device storing one or more instructions which, when executed by one or more processors, cause the one or more processors to:
receive data items associated with a plurality of sources;
sequentially forward the received data items through a plurality of sequential processes to reorder the received data items, on a per-source basis, to correspond to an order in which the received data items were transmitted by the plurality of sources; and
store information, used by one or more of the plurality of sequential processes to reorder particular data items, of the received data items, transmitted by a corresponding source, of the plurality of sources, in a corresponding set of context memories, of a plurality of sets of context memories, to reorder the particular data items,
the corresponding set of context memories being associated with the corresponding source, and
other sets of context memories, of the plurality of sets of context memories, being associated with other sources of the plurality of sources.

8. The non-transitory memory device of claim 7, where the one or more instructions to sequentially forward the received data items include:
one or more instructions which, when executed by the one or more processors, cause the one or more processors to:
determine a sequence number associated with a particular data item of the particular data items,
calculate a position of the particular data item relative to other data items, of the particular data items, based on the determined sequence number, and
forward the particular data item based on the calculated position of the particular data item.

9. The non-transitory memory device of claim 7, where the one or more instructions to store the information include:
one or more instructions which, when executed by the one or more processors, cause the one or more processors to:
write addresses, associated with the particular data items, in a memory of the corresponding set of context memories, and
where the addresses are written in the memory to correspond to a particular order in which the particular data items were transmitted.

10. The non-transitory memory device of claim 9, where the one or more instructions to write the addresses include:
one or more instructions which, when executed by the one or more processors, cause the one or more processors to:
compute the addresses based on sequence numbers associated with the particular data items, and
write the addresses based on computing the addresses.

11. The non-transitory memory device of claim 7, where the one or more instructions to sequentially forward the received data items include:
one or more instructions which, when executed by the one or more processors, cause the one or more processors to:
perform a particular process, of the plurality of sequential processes, to determine a source, of the plurality of sources, that transmitted a particular data item of the particular data items; and
forward the particular data item based on the source.

12. The non-transitory memory device of claim 7, where the one or more instructions to sequentially forward the received data items further include:
one or more instructions which, when executed by the one or more processors, cause the one or more processors to:
perform a particular process, of the plurality of sequential processes, to calculate a position of a particular data item, of the particular data items, relative to other data items, of the particular data items, based on a sequence number of the particular data item, and
forward the particular data item based on the position.

13. The non-transitory memory device of claim 12, where the one or more instructions to perform the particular process include:
one or more instructions which, when executed by the one or more processors, cause the one or more processors to:
calculate the position of the data item based on a modulo operation of the sequence number, of the data item, with a size of a memory of the corresponding set of context memories.

14. A network device comprising:
a memory to store instructions; and
a processor which executes the instructions to:
receive data items associated with a plurality of sources, and
sequentially forward the received data items through a plurality of sequentially process to reorder, on a per-source basis, the received data items into a second order,
when sequentially forwarding the received data items, the processor is to:
calculate a position of a particular data item, of a group of data items, of the received data items, relative to other data items, of the group of data items, based on a sequence number of the particular data item and a modulo operation, and
sequentially forward the particular data item,
the received data items being transmitted by the plurality of sources in the second order, and
the second order being different from the first order.

15. The network device of claim 14,
where the position of the particular data item is calculated further based on a size of a reorder buffer within a set of context memories of a plurality of sets of context memories, and
where each set of context memories, of the plurality of sets of context memories, is associated with one of the plurality of sources.

16. The network device of claim 15, where the set of context memories includes a valid bit array, associated with the reorder buffer, that indicates whether entries in the reorder buffer are valid.

17. The network device of claim 14, where, when sequentially forwarding the received data items, the processor is to:

update a memory, within one or more sets of context memories, of a plurality of sets of context memories, with addresses of the received data items in the first order.

18. The network device of claim 17, where the memory, within the one or more sets of context memories, is updated with the addresses of the received data items on the per-source basis.

19. The network device of claim 14, where the processor is further to:
store information used by or more of the plurality of sequential processes to reorder the group of data items.

20. The network device of claim 19, where the information is stored in a corresponding set of context memories.

* * * * *